United States Patent
Labarre et al.

(10) Patent No.: US 11,608,391 B2
(45) Date of Patent: Mar. 21, 2023

(54) PROGRESSIVE SALTING-OUT OF POLYMER CHAINS IN A LIQUID MEDIUM

(71) Applicant: RHODIA OPERATIONS, Aubervilliers (FR)

(72) Inventors: Dominique Labarre, Neuilly sur Seine (FR); David James Wilson, Coye-la-Foret (FR)

(73) Assignee: RHODIA OPERATIONS, Aubervilliers (FR)

( * ) Notice: Subject to any disclaimer, the term of this patent is extended or adjusted under 35 U.S.C. 154(b) by 0 days.

(21) Appl. No.: 17/257,839

(22) PCT Filed: Jul. 2, 2019

(86) PCT No.: PCT/EP2019/067683
§ 371 (c)(1),
(2) Date: Jan. 4, 2021

(87) PCT Pub. No.: WO2020/007828
PCT Pub. Date: Jan. 9, 2020

(65) Prior Publication Data
US 2021/0230471 A1    Jul. 29, 2021

(30) Foreign Application Priority Data
Jul. 2, 2018   (FR) .................................... 1856076

(51) Int. Cl.
*C09K 8/52* (2006.01)
*C08F 2/22* (2006.01)
*C08F 293/00* (2006.01)
*C09K 8/528* (2006.01)
*C09K 8/54* (2006.01)
*C08F 220/18* (2006.01)

(52) U.S. Cl.
CPC ............ *C08F 2/22* (2013.01); *C08F 293/005* (2013.01); *C09K 8/528* (2013.01); *C09K 8/54* (2013.01); *C08F 220/1812* (2020.02); *C08F 2438/03* (2013.01); *C09K 2208/22* (2013.01); *C09K 2208/32* (2013.01)

(58) Field of Classification Search
CPC .......... C09K 8/524; C09K 8/52; C09K 8/528; C09K 2208/10; C09K 2208/26; C09K 8/54; C09K 2208/22; C09K 2208/32; C09K 8/882; C08F 22/385; C08F 220/06; C08F 2/22; C08F 293/005; C08F 220/1812; C08F 2438/03; C08F 2/38
See application file for complete search history.

(56) References Cited

U.S. PATENT DOCUMENTS

| 4,565,647 | A | 1/1986 | Llenado |
| 5,060,728 | A | 10/1991 | Yan |
| 7,196,040 | B2 | 3/2007 | Heath et al. |
| 7,244,693 | B2 | 7/2007 | Kotlar et al. |
| 7,332,459 | B2 | 2/2008 | Collins et al. |
| 7,473,672 | B2 | 1/2009 | Kotlar et al. |
| 2005/0028976 | A1 | 2/2005 | Nguyen |
| 2006/0124301 | A1 | 6/2006 | Gupta et al. |
| 2010/0093874 | A1 | 4/2010 | Monin et al. |
| 2011/0092634 | A1* | 4/2011 | Gonzalez ................ C08L 53/00 526/263 |
| 2011/0243873 | A1* | 10/2011 | Hough ................. C11D 3/3951 526/273 |
| 2014/0378617 | A1* | 12/2014 | Wilson ................... C09K 8/882 525/291 |
| 2015/0060062 | A1 | 3/2015 | Shen et al. |

FOREIGN PATENT DOCUMENTS

| EP | 2457973 A1 | 5/2012 |
| FR | 2794464 A1 | 12/2000 |
| GB | 298440 A | 10/1928 |
| JP | 2014162912 A | 9/2014 |
| JP | 2014162912 A * | 9/2014 |
| WO | 9630421 A1 | 10/1996 |
| WO | 9801478 A1 | 1/1998 |
| WO | 9858974 A1 | 12/1998 |
| WO | 9931144 A1 | 6/1999 |
| WO | 9935177 A1 | 7/1999 |
| WO | 9935178 A1 | 7/1999 |
| WO | 0075207 A1 | 12/2000 |
| WO | 0142312 A1 | 6/2001 |
| WO | 0226836 A2 | 4/2002 |

(Continued)

OTHER PUBLICATIONS

Lamaire-Audoire (S. Lamaire-Audoire, et. al., Selective deprotection of allyl amines using palladium, Tetrahedron Letters, 1995, 36, 1267-1270).*

(Continued)

*Primary Examiner* — Kumar R Bhushan

(74) *Attorney, Agent, or Firm* — Osha Bergman Watanabe & Burton LLP

(57) ABSTRACT

Provided is a method making it possible to ensure a gradual release of polymer chains within a liquid medium, the method comprising bringing the liquid medium into contact with specific solid objects formed by polymer chains soluble in the medium and carrying hydrophobic side groups ensuring physical crosslinking between the polymer chains within the solid objects. The released chains may in particular be used as inhibitors of the formation of inorganic or organic deposits (scale inhibitors) within a liquid medium, typically in the field of oil extraction.

14 Claims, No Drawings

(56) References Cited

FOREIGN PATENT DOCUMENTS

| WO | 03068827 A1 | 8/2003 |
| WO | 03068848 A2 | 8/2003 |
| WO | 2005021612 A1 | 3/2005 |
| WO | 2013060741 A1 | 5/2013 |

OTHER PUBLICATIONS

International Search Report issued in corresponding International Application No. PCT/EP2019/067683; dated Jul. 19, 2019 (2 pages).
Written Opinion of the International Searching Authority issued in corresponding International Application No. PCT/EP2019/067683; dated Jul. 19, 2019 (6 pages).

* cited by examiner

PROGRESSIVE SALTING-OUT OF POLYMER CHAINS IN A LIQUID MEDIUM

The present invention relates to a method making it possible to ensure a gradual release of polymer chains, such as chains useful as inhibitors of the formation of inorganic or organic deposits (scale inhibitors) in a liquid medium, typically within liquid media employed in oil extraction, namely liquid media, in particular of natural origin, encountered during oil extraction operations.

During the extraction of oil from a hydrocarbon reservoir (oil-bearing reservoir, such as a consolidated or unconsolidated rock formation, or a sand, for example), various factors may induce the appearance of deposits, the formation of which it is important to inhibit in order to prevent phenomena of obstruction of the underground formation (rock and/or well), which result in a slowing down, indeed even halt, in production. Various types of deposits may be formed within a hydrocarbon reservoir, such as scale (essentially inorganic deposits based on calcium carbonate, barium sulfate, strontium sulfate, calcium sulfate and/or calcium fluoride).

In order to prevent the formation of these deposits, it has been recommended to employ inhibitors which are either continuously injected into the wells but do not protect the underground formation close to the well, or placed under pressure in the underground formation according to a step called the squeeze step and then making it possible to protect the reservoir zone.

However, as a general rule, this method does not make it possible to protect the well and the formation over time, and the inhibitors have to be often replenished (the inhibitors may, during squeeze operations, form in situ sorts of release systems in the reservoir rock and lead to a gradual release (on this subject, reference may in particular be made to GB 2 298 440, US 2006124301, U.S. Pat. Nos. 7,196,040, 7,244,693 or US20050028976) but the speed and intensity thereof are difficult to control, with in particular a release time which is generally short, typically of the order of a few days to a few weeks). The need to replenish the inhibitors penalizes the productivity, given that the well is shut down during the placement (squeeze) step.

For this reason, the oil industry is seeking to replace these squeeze operations, in particular in outputs resulting from hydraulic fracturing operations where granular materials (proppants, gravel packs) are emplaced in order to optimize the circulation of fluids.

To this end, attempts are being made in particular to develop systems which make possible a gradual release of inhibitors over time, with the objective of releasing the inhibitors over a period covering the life of the well (namely several years) and at a concentration greater than their MIC (Minimum Inhibition Concentration, designating the minimum concentration ensuring inhibition under the conditions of a given well).

It has been proposed to employ crosslinked polymer materials based on scale-inhibiting polymer chains (polyacrylates in particular) which are preformed and then crosslinked with one another by hydrolyzable crosslinking bridges of ester or amide type, typically by reaction of the carboxylate functional groups of the chains with a polyol or a polyamine (U.S. Pat. Nos. 5,060,728, 7,332,459, 7,473, 672 in particular) or organometallic compounds (US 2015/0060062).

The present invention provides a new method making it possible to ensure a gradual release of polymer chains such as inhibitors of the abovementioned type. The method of the invention employs objects, typically of the granular type, comprising a multitude of chains to be released which are initially crosslinked with one another and which will be gradually released over time. It also relates to the compositions of crosslinked polymer chains employed in this context.

More specifically, according to a first aspect, the present invention relates to a method for the gradual release of polymer chains within a liquid release medium (LRM), said method comprising a step (S) where said medium (LRM) is brought into contact with solid objects formed by polymer chains soluble in the medium (LRM) and carrying hydrophobic side groups ensuring hydrophobic/hydrophobic physical crosslinking between said polymer chains within said solid objects. The gradual release takes place from the solid objects to the release medium LMR.

Within the meaning of the present description, the term "physical crosslinking" is understood to mean, in contrast to chemical crosslinking, a reversible noncovalent association between two groups.

During step (S) of the present invention, due to the reversible nature of the physical crosslinking, the polymer chains are gradually released from the solid objects to the medium (LRM). It is possible, in particular by varying the nature and the number of the hydrophobic side groups ensuring the physical crosslinking, to easily adjust the speed and the intensity of the release. The use of hydrophobic groups ensuring physical crosslinking makes it possible generally to obtain relatively long release kinetics but with sufficient intensity at the temperatures employed in the context of an oil extraction operation.

According to another aspect, a subject matter of the present invention is the novel compositions based on crosslinked polymers constituting the objects used in the context of step (S), namely the compositions comprising water-soluble polymer chains carrying hydrophobic side groups ensuring hydrophobic/hydrophobic physical crosslinking between said polymer chains.

Typically, and in particular when they are intended to act as inhibitor, the polymer chains released during step (S) have a number-average molecular weight of between 500 and 100 000 g/mol, preferably between 1000 and 25 000 g/mol.

The molecular weight may be measured by the techniques known to a person skilled in the art, for example by GPC-MALS.

Furthermore, although the method of the invention is not limited to a specific medium, the medium (LRM) where the polymer chains are released during step (S) is typically an aqueous medium, in which case the polymer chains released are water-soluble.

According to a particularly advantageous embodiment, the soluble polymer chains constituting the solid objects employed in step (S) result from a step (S0) of micellar radical polymerization in which the following are brought into contact, within an aqueous medium (M):

ethylenically unsaturated monomers (m1), dissolved or dispersed in said aqueous medium (M), known as "hydrophilic monomers";

ethylenically unsaturated monomers (m2), in the form of a micellar solution, known as "hydrophobic monomers", namely containing, in the dispersed state within the medium (M), micelles comprising these hydrophobic monomers, said monomers (m2) being, in all or part, carriers of hydrophobic chains suitable for ensuring the desired hydrophobic/hydrophobic physical crosslinking in the solid objects employed in step (S);

at least one radical polymerization initiator, which is preferably water-soluble or water-dispersible; and preferably at least one radical polymerization control agent.

In general, the molar ratio (m2)/(m1), which corresponds to the amount of hydrophobic monomers (m2) with respect to the amount of hydrophilic monomers (m1), is less than 10%. Typically, this molar ratio is between 0.1% and 5%, for example between 0.2 and 3%. According to an advantageous form, this ratio is between 0.4% and 2%

In the context of the present invention, a step (S1) is generally carried out after step (S0), where the polymers obtained on conclusion of step (S0) are extruded and dried (and ground, if necessary), whereby the polymers are obtained in the form of solid granular objects.

According to one embodiment, the polymers obtained are typically in the form of particles with dimensions of less than 4 mm, more preferentially of less than 3 mm and typically of greater than 50 μm and more preferentially of greater than 100 μm. The size of the particles obtained may be measured, for example by particle sizing by sieving.

Conventional extrusion, grinding and drying means known to a person skilled in the art may be used. Mention may be made, by way of example, of screw extrusion techniques, fluid bed drying and grinding by pin mills, hammer mills, ball mills or air jet grinding. These techniques may optionally be carried out according to the cryomilling mode.

The aqueous medium (M) employed in step (S0) is a medium comprising water, preferably at a level of at least 50% by weight, indeed even at least 80%, for example at least 90%, indeed even at least 95% by weight. This aqueous medium may optionally comprise solvents other than water, for example a water-miscible alcohol. Thus, the medium (M) may, for example, be an aqueous/alcoholic mixture.

According to one possible alternative form, the medium (M) may comprise other solvents, preferably in a concentration where said solvent is water-miscible, which may in particular make it possible to reduce the amount of stabilizing surfactants employed. Thus, for example, the medium (M) may comprise pentanol or any other additive which makes it possible to adjust the aggregation number of the surfactants. In general, it is preferable for the medium (M) to be a continuous phase of water consisting of one or more solvents and/or additives which are miscible with one another and in water in the concentrations where they are employed.

Another advantage of the solid objects of the present invention is that they are easy to prepare and easy to handle in the final application.

According to a particularly advantageous alternative form of the invention, the monomers employed in step (S0) contain monomers (mR) comprising at least two ethylenic unsaturations separated by at least one cleavable group (known as "cleavable chemical crosslinking agents").

The use of cleavable chemical crosslinking agents proves to be very particularly advantageous for facilitating the shaping of the polymer compositions on conclusion of step (S0). The presence of these cleavable chemical crosslinking agents makes it possible in particular to obtain a structured gel (also denoted below by the term of "macrogel") on conclusion of step (S0), which may subsequently be shaped, for example in the form of solid granular objects according the abovementioned step (S1).

Typically, in particular so as to obtain sufficient crosslinking, the molar ratio (mR)/(m1), which corresponds to the amount of crosslinking monomers (mR) with respect to the total amount of hydrophilic monomers, is greater than 0.5%, for example greater than 1%, indeed even than 2%. This ratio is greater than 3%, indeed even than 5%, when particularly high crosslinking is desired. Nevertheless, in particular taking into account the problem of costs, it is generally preferable for the molar ratio (mR)/(m1) to remain less than or equal to 30%, preferentially less than or equal to 20%, indeed even less than or equal to 10%. A molar ratio (mR)/(m1) of between 2% and 10% thus constitutes, in general, a satisfactory compromise.

Within the meaning of the present invention, the term "cleavable group" is understood to mean an at least divalent group, present within a chain, which is stable at least under certain pH and temperature conditions but which is lyzed, by inducing a chain cleavage, when it is subjected to a temperature greater than a limiting temperature (thermal cleavage) and/or when it is placed under specific pH conditions (pH-induced cleavage). The lysis of the cleavable group(s) present on the chain is preferably carried out irreversibly and without lyzing the remainder of the chain.

The cleavable groups present on the polymer chains are generally identical to those present on the monomers (mR) and they are typically divalent -ester-; -amide-; -ether-; -ether phosphate-; or else alternatively -ether sulfate-; or alternatively carbonate or carbamate groups. According to an advantageous embodiment, they are ester or amide groups, in particular an ester functional group. Generally, the polymer compositions are synthesized under pH and temperature conditions where said cleavable groups are stable.

It is preferable in general for the monomers m1 not to carry cleavable groups.

As regards the monomers m2, according to one possible embodiment, these monomers m2 carry cleavable groups. However, according to another conceivable embodiment, the monomers m2 do not carry cleavable groups, in particular cleavable groups of the abovementioned type.

When the cleavable groups are present in the solid objects of the invention, these groups are so many "weak points" which induce a progressive loss of the crosslinking when the solid objects are subjected to cleavage-inducing temperature and/or pH conditions. The temperature conditions required are typically obtained when the solid objects of the invention are injected within the medium (LRM) and the pH conditions may be obtained at any time, if need be, by injection of a base or of an acid in order to obtain the cleavage pH.

The method of the invention makes it possible, depending on the temperature and pH conditions prevailing within the underground formation where the use of the solid objects is envisaged, to adjust the polymer composition employed, so as to obtain the desired release profile. The rate of release may be adjusted by varying:

the nature of the hydrophobic groups (the weaker the hydrophobic/hydrophobic association, the faster the release) and;

the number of hydrophobic side groups as well as their sequence in the polymer chain (number of units per hydrophobic block) (the rate of release will become lower as the number of these side groups increases).

In the alternative form of the invention where the monomers (mR) are employed, the rate of release may be additionally adjusted by varying:

the nature of the cleavable group on the chemical crosslinking monomers (the weaker the group, the faster the release) and;

the number of chemical crosslinking monomers in the polymer chain (the rate of release will become lower as the number of these crosslinking monomers increases).

Although the method of release of the invention may be employed to effect a gradual release of various types of polymer chains, the process proves above all to be particularly suitable for the release of polymer chains which are polymer chains useful as scale-inhibiting, clathrate-inhibiting and/or corrosion-inhibiting agent.

Thus, according to an advantageous embodiment, that the polymer chains released in step (S) are based on monomers capable of providing a scale-inhibiting, clathrate-inhibiting and/or corrosion-inhibiting effect.

In particular, it is very particularly advantageous to carry out step (S) in order to release polymer chains based on polyacrylic acid.

Furthermore, the method of the invention is very particularly suitable for the field of oil extraction and an advantageous medium (LRM) for step (S) is consequently a liquid medium (typically saline) encountered during the extraction of oil within a hydrocarbon reservoir.

The method of the invention is very particularly suitable for temperatures corresponding to those employed in oil operations. Thus, step (S) is preferably carried out at a temperature of greater than or equal to 50° C., generally of less than or equal to 150° C., for example between 60° C. and 120° C.

Micellar Radical Polymerization

The term "micellar radical polymerization" is understood to mean, within the meaning of the present description, a polymerization which also will be denoted by "micellar polymerization" for the purposes of brevity in the continuation of the description, in which block polymers of multiblock type are synthesized by copolymerization of hydrophilic monomers and of hydrophobic monomers within an aqueous dispersing medium (typically water or a water/alcohol mixture) which comprises:

the hydrophilic monomers in the dissolved or dispersed state in said medium; and
the hydrophobic monomers present within micelles.

The micelles employed in micellar polymerization are formed in the aqueous medium by a surfactant which forms these micelles, which surfactant is introduced into said medium at a concentration greater than its critical micelle concentration (cmc) in the presence of the hydrophilic monomers in the medium (M).

According to a specific embodiment, the hydrophobic monomers present within micelles employed in micellar polymerization may be monomers which in themselves have the property of forming micelles, without having, in order to do this, the need to add additional surfactants (these monomers are said to be "self-micellizable" in the continuation of the description). According to this specific embodiment, the surfactant employed to form the micelles may be the self-micellizable hydrophobic monomer itself employed without other surfactant, but the presence of an additional surfactant is not, however, excluded when self-micellizable monomers are employed.

Thus, within the meaning of the present description, when mention is made of "hydrophobic monomers within micelles", this notion encompasses in particular:

mode 1: hydrophobic monomers present within micelles formed by surface-active agents, where said surface-active agents are distinct from the hydrophobic monomers; and/or
mode 2: self-micellizable monomers forming by themselves micelles in an aqueous medium, with micelles which may then be formed in all or part by said self-micellizable monomers.

The abovementioned modes 1 and 2 are compatible and may coexist (hydrophobic monomers which are not self-micellizable within micelles formed by another self-micellizable monomer, for example; or alternatively micelles comprising a combination of surface-active agents and of self-micellizable monomers).

In micellar polymerization, the hydrophobic monomers contained in the micelles are said to be in "micellar solution". The micellar solution to which reference is made is a microheterogeneous system which is generally isotropic, optically transparent and thermodynamically stable.

It should be noted that a micellar solution of the type employed in micellar polymerization should be distinguished from a microemulsion. In particular, unlike a microemulsion, a micellar solution is formed at any concentration exceeding the critical micelle concentration of the surfactant employed, with the sole condition that the hydrophobic monomer be soluble at least to a certain extent within the internal space of the micelles. A micellar solution furthermore differs from an emulsion by the absence of a homogeneous internal phase: the micelles contain a very small number of molecules (typically less than 1000, generally less than 500 and typically from 1 to 100, with most often 1 to 50, monomers, and at most a few hundred surfactant molecules, when a surfactant is present) and the micellar solution generally has physical properties similar to those of the monomer-free surfactant micelles. Furthermore, generally, a micellar solution is transparent with regard to visible light, in view of the small size of the micelles, which does not result in phenomena of refraction, unlike the drops of an emulsion, which refract light and confer on it its characteristic cloudy or white appearance.

The micellar polymerization technique results in characteristic block polymers which each contain several hydrophobic blocks of substantially the same size and where this size may be controlled. This is because, in view of the confinement of the hydrophobic monomers within the micelles, each of the hydrophobic blocks formed is of controlled size and contains substantially a defined number $n_H$ of hydrophobic monomers, it being possible for this number $n_H$ to be calculated as follows (Macromolecular Chem. Physics, 202, 8, 1384-1397, 2001):

$$n_H = N_{agg} \cdot [M_H]/([\text{surfactant}] - cmc)$$

where:

$N_{agg}$ is the aggregation number of the surfactant, which reflects the number of surfactant present in each micelle
$[M_H]$ is the molar concentration of hydrophobic monomer in the medium
[surfactant] is the molar concentration of surfactant in the medium and
cmc is the critical micelle (molar) concentration.

The micellar polymerization technique thus makes possible an advantageous control of the hydrophobic units introduced into the polymers formed, namely:

an overall control of the molar fraction of hydrophobic units in the polymer (by adjusting the ratio of the concentrations of the two monomers); and
a more specific control of the number of hydrophobic units present in each of the hydrophobic blocks (by modifying the parameters influencing the $n_H$ defined above).

The polymers obtained in micellar polymerization are amphiphilic block polymers which have a specific controlled structure, namely, schematically, based on a backbone formed of hydrophilic (water-soluble or water-dispersible) units interrupted at various places by small hydrophobic blocks, these hydrophobic blocks all being of number of substantially identical monomer units.

According to the alternative form where the specific monomers (mR) are employed in step (S0), the polymer chains obtained according to the invention are additionally crosslinked. The compositions of polymers obtained in step (S0) exist for this reason in the form of a chemically crosslinked gel.

According to a preferred embodiment, the compositions of polymers according to the invention are polymers as obtained according to a micellar radical polymerization step (S0) which is specifically a radical polymerization of controlled type, namely carried out in the presence of an agent for control of the radical polymerization. Within the meaning of the present description, the term "radical polymerization control agent" (or more simply "control agent") is understood to mean a compound capable of lengthening the lifetime of the growing polymer chains in a polymerization reaction and, preferably, of conferring, on the polymerization, a living or controlled nature.

When a radical polymerization control agent of the above-mentioned type is employed, in addition to the advantages related to the implementation of the micellar polymerization, it proves to be possible to control the average molecular weight of the polymers as obtained on conclusion of step (S0): this weight may be controlled by the amount of control agent used (for a given amount of hydrophilic monomers, the weight generally decreases as this amount increases).

Thus, in the case where the step employs a radical polymerization control agent, the polymer compositions resulting from step (S0) exhibit a controlled average molar mass.

In a way known per se, in step (S0), the (control agent)/(m1+m2) ratio by weight, calculated by the ratio of the weight of control agent with respect to the total weight of monomers, dictates the molecular weight obtained for the polymer synthesized. This ratio is advantageously between 0.2% and 42% by weight in step (S0), for example between 1% and 25% by weight, in particular between 5% and 20% by weight.

According to an advantageous embodiment of the invention, in step (S0), the initial concentration of control agent in the medium is chosen such that the average molecular weight of the polymer synthesized is Mn less than or equal to 100 000 g/mol, preferably between 500 and 50 000 g/mol, for example between 1000 and 25 000 g/mol.

According to one possible embodiment, it is possible to use in step (S0) a control agent which is a radical polymerization control agent of irreversible type, typically chosen from mercaptans, such as mercaptopropionic acid, thioglycolic acid or mercaptoethanol, primary or secondary alcohols, such as ethanol or isopropanol, or alternatively formic acid and its salts.

Alternatively, according to a particularly advantageous embodiment, the control agent employed in step (S0) is a reversible transfer agent as employed in controlled radical polymerizations denoted under the terminology RAFT or MADIX, which typically employ a reversible addition-fragmentation transfer method, such as those described, for example, in WO 96/30421, WO 98/01478, WO 99/35178, WO 98/58974, WO 00/75207, WO 01/42312, WO 99/35177, WO 99/31144, FR 2 794 464 or WO 02/26836.

When a reversible-type radical polymerization control agent is employed, the polymers as obtained on conclusion of step (S0) exhibit, in addition to the advantages related to the implementation of the micellar polymerization (namely, the control of the molar fraction of hydrophobic units in the polymers; and a control of the number of hydrophobic units in each hydrophobic block):

a control of the average molecular weight (which may be finely controlled by the amount of control agent used: for a given amount of hydrophilic monomers, the weight decreases as this amount increases); and a control of the distribution of the hydrophobic blocks within the various chains;

the production of polymer chains having a living nature, offering the possibility of preparing complex polymers having controlled architecture.

These advantages are very particularly pronounced when the radical polymerization control agent employed is a compound which is soluble or dispersible in the aqueous medium (M) employed in step (S0), and/or when this control agent is not suitable for penetrating into the micelles of the micellar solution. This effect may also be observed in the case where the control agent is not soluble/dispersible in the medium (M) or when the control agent is suitable for penetrating into the micelles.

Thus, according to the alternative form where the specific monomers (mR) and a control agent of the reversible type are employed in step (S0), the macrogels on conclusion of step (S0) additionally exhibit a finely controlled average molar mass and a homogeneity in the distribution of cross-linking points.

According to a specific embodiment, the control agent employed in step (S0) may be a polymer chain resulting from a controlled radical polymerization and carrying a group which is capable of controlling a radical polymerization (polymer chain said to be of "living" type, of type well known per se). Thus, for example, the control agent may be a polymer chain (preferably hydrophilic or water-dispersible) functionalized at the chain end by a xanthate group or more generally comprising an —SC=S— group, for example obtained according to the RAFT/MADIX technology.

Alternatively, the control agent employed in step (S0) is a nonpolymer compound carrying a group which ensures control of the radical polymerization, in particular a thiocarbonylthio —S(C=S)— group.

According to an advantageous embodiment, the radical polymerization control agent employed in step (S0) is a compound which comprises a thiocarbonylthio —S(C=S)— group. Thus, for example, it may be a compound which comprises a xanthate group (carrying —SC=S—O— functional groups), for example a xanthate. Other types of control agent which are employed in controlled radical polymerization may be envisaged (for example of the type of those employed in CMP, in ATRP or in NMP).

The use of a control agent for step (S0) of this type in the polymerization reaction makes it possible to finely control the size of the polymer chains and the molecular weight and, in the case where the monomers mR are employed, the degree of crosslinking, which makes it possible to very finely and very precisely adjust the properties of the polymer composition. It additionally induces a homogeneity in the polymer composition synthesized, which makes it possible to obtain, on conclusion of step (S1), particles which all exhibit substantially the same compositions and properties.

According to a specific alternative form, the radical polymerization control agent employed in step (S0) is a polymer, advantageously an oligomer, having a water-soluble or water-dispersible nature and carrying a thiocarbonylthio —S(C=S)— group, for example a xanthate —SC=SO— group. This polymer, which is capable of acting both as agent for control of the polymerization and as monomer in step (S0), is also denoted by "prepolymer" in the continuation of the description. Typically, this prepolymer is obtained by radical polymerization of hydrophilic monomers in the presence of a control agent carrying a thiocarbonylthio —S(C=S)— group, for example a xanthate. Thus, for example, according to an advantageous embodiment which is illustrated at the end of the present description, the control agent employed in step (S0) may advantageously be a prepolymer carrying a thiocarbonylthio —S(C=S)— group, for example a xanthate —SC=S—O— group, obtained on conclusion of a controlled radical polymerization step $(S0^0)$ prior to step (S0). In this step $(S0^0)$, hydrophilic monomers, advantageously identical to those employed in step (S0), a radical polymerization initiator and a control agent carrying a thiocarbonylthio —S(C=S)— group, for example a xanthate, may typically be brought into contact.

The use of the abovementioned step $(S0^0)$ prior to step (S0) makes it possible, schematically, to hydrophilize a large number of control agents carrying thiocarbonylthio functional groups (for example xanthates, which are rather hydrophobic by nature), converting them prepolymers soluble or dispersible in the medium (M) of step (S0). Preferably, a prepolymer synthesized in step $(S0^0)$ has a short polymer chain, for example comprising a sequence of less than 50 monomer units, indeed even less than 25 monomer units, for example between 2 and 15 monomer units.

Various characteristics and embodiments of the invention will now be described in even more detail.

The Hydrophilic Monomers (m1)

A very large number of hydrophilic monomers may be employed in step (S0) described above.

Typically, the monomers may comprise monomers selected from:
- carboxylic acids which are ethylenically unsaturated, sulfonic acids and phosphonic acids, and/or their derivatives, such as acrylic acid (AA), methacrylic acid, Sipomer B-CEA (sold by Solvay), ethacrylic acid, α-chloroacrylic acid, crotonic acid, maleic acid, maleic anhydride, itaconic acid, citraconic acid, mesaconic acid, glutaconic acid, aconitic acid, fumaric acid, monoesters of monoethylenically unsaturated dicarboxylic acids comprising from 1 to 3, preferably from 1 to 2, carbon atoms, for example monomethyl maleate, vinylsulfonic acid, (meth)allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acids, 2-acrylamido-2-methylpropanesulfonic acid, vinylphosphonic acid, α-methylvinylphosphonic acid and allylphosphonic acid;
- esters of α,β-ethylenically unsaturated mono- and dicarboxylic acids with $C_2$-$C_3$ alkanediols, for example 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate and polyalkylene glycol (meth)acrylates, and the corresponding alkylated amides;
- amides of α,β-ethylenically unsaturated monocarboxylic acids and their N-alkyl and N,N-dialkyl derivatives, such as acrylamide, methacrylamide, N-methyl(meth)acrylamide, N-ethyl(meth)acrylamide, N-propyl(meth)acrylamide, N,N-dimethyl(meth)acrylamide, N,N-diethyl(meth)acrylamide, morpholinyl(meth)acrylamide and methylolacrylamide (acrylamide and N,N-dimethyl(meth)acrylamide prove to be especially advantageous), and the corresponding alkylated quaternary ammoniums;
- N-vinyllactams and their derivatives, for example N-vinylpyrrolidone or N-vinylpiperidone;
- N-vinylamide compounds having open chains, for example N-vinylformamide, N-vinyl-N-methylformamide, N-vinylacetamide, N-vinyl-N-methylacetamide, N-vinyl-N-ethylacetamide, N-vinylpropionamide, N-vinyl-N-methylpropionamide and N-vinylbutyramide;
- esters of α,β-ethylenically unsaturated mono- and dicarboxylic acids with aminoalcohols, for example N,N-dimethylaminomethyl (meth)acrylate, N,N-dimethylaminoethyl (meth)acrylate, N,N-diethylaminoethyl acrylate and N,N-dimethylaminopropyl (meth)acrylate;
- amides of α,β-ethylenically unsaturated mono- and dicarboxylic acids with diamines comprising at least one primary or secondary amino group, such as N-[2-(dimethylamino)ethyl]acrylamide, N-[2-(dimethylamino)ethyl]methacrylamide, N-[3-(dimethylamino)propyl]acrylamide, N-[3-(dimethylamino)propyl]methacrylamide, N-[4-(dimethylamino)butyl]acrylamide and N-[4-(dimethylamino)butyl]methacrylamide, and their alkylation products (quaternary ammoniums);
- N-diallylamines, N,N-diallyl-N-alkylamines, their acid addition salts and their quaternization products, the alkyl employed here preferentially being $C_1$-$C_3$ alkyl;
- N,N-diallyl-N-methylamine and N,N-diallyl-N,N-dimethylammonium compounds, for example the chlorides and the bromides;
- nitrogenous heterocycles substituted with vinyl and allyl, for example N-vinylimidazole, N-vinyl-2-methylimidazole, heteroaromatic compounds substituted with vinyl and allyl, for example 2- and 4-vinylpyridine, 2- and 4-allylpyridine, and their salts;
- monomers carrying sulfobetaine groups; and
- the mixtures and combinations of two or more of the abovementioned monomers.

According to a specific embodiment, these monomers may in particular comprise acrylic acid (AA). According to one possible embodiment, the monomers are all acrylic acids but it is also possible to envisage the use, as monomers, of a mixture comprising inter alia acrylic acid as a mixture with other hydrophilic monomers.

The monomers containing acid groups may be used for the polymerization in the form of the free acid or in the partially or completely neutralized form. KOH, NaOH, aqueous ammonia or another base may be used, for example, for the neutralization.

According to another specific embodiment, the monomers employed in the process of the invention are in particular acrylic acid, methacrylic acid and/or their salts and/or their mixtures.

Whatever their exact nature, the monomers (m1) of step (S0) may be employed at relatively high concentrations, typically at concentrations which would be sufficient to ensure the formation of gel if step (S0) were carried out in the absence of control agent. The inventors have now demonstrated that, surprisingly, the polymerization of step (S) may, if need be, be carried out under conditions which correspond to those of the "gel" polymerization, with high contents of monomers, without necessarily resulting in gelling of the reaction medium during the polymerization when it is carried out in the presence of a control agent. Whether or not gelation of the medium is observed, step (S) above all makes it possible, surprisingly, to maintain a controlled-type polymerization despite the high concentration of monomers.

Typically, the initial concentration of monomers in the reaction medium of step (S) may range up to 40% by weight, indeed even up to 50% by weight, this concentration generally remaining less than 30% by weight, with respect to the total weight of the reaction medium. For example, the initial concentration of monomers in the reaction medium of step (S) is between 0.5% and 35% and in particular between 1% and 20% by weight, with respect to the total weight of the reaction medium.

According to a specific embodiment, the hydrophilic monomers employed in step (S0) are heat-sensitive macromonomers which are insoluble in water beyond a certain temperature (cloud point) but are soluble at lower temperature, step (S0) being carried out, at least partially, at a temperature below the temperature of the cloud point. Macromonomers of this type typically exhibit a polymerizable functional group of acrylamido type, and a side chain composed of ethylene oxide or propylene oxide sequences (random or in blocks), or alternatively based on N-isopropylacrylamide or on N-vinylcaprolactam.

When the polymer chains are used as scale-inhibiting agent, it is possible to employ, as monomer (m1) according to the invention, any monomer, the resulting polymer of which is known as inducing an effect of inhibiting the formation of inorganic and/or organic deposits, such as scale.

In particular, according to an advantageous embodiment, the monomers m1 may typically be acrylic acid monomers, which result in the formation of poly(acrylic acid), well known as an inhibitor of the formation of barium sulfate scale.

More generally, use may be made, as hydrophilic monomers m1 according to the invention, of acids and their derivatives (in particular anhydrides, esters and chlorinated derivatives, such as acid chlorides), these acids and derivatives of use as monomers m1 according to the invention typically being selected from:

acrylic acid, methacrylic acid and ethacrylic acid;
α-chloroacrylic acid, crotonic acid, maleic acid, maleic anhydride, itaconic acid, citraconic acid, mesaconic acid, glutaconic acid, aconitic acid or fumaric acid;
bromoacrylic acid, bromomethylacrylic acid, α-cyanoacrylic acid, β-methylacrylic acid, α-phenylacrylic acid, β-acryloyloxypropionic acid, β-carboxyethylacrylic acid (oligomerized acrylic acid, such as that sold under the name of Sipomer B-CEA), sorbic acid, α-chlorosorbic acid, angelic acid, cinnamic acid, β-chlorocinnamic acid, β-styrylacrylic acid, itaconic acid, vinylbenzoic acid, propylacrylic acid, acetamidoacrylic acid or maleimidopropylcarboxylic acid;
monoesters of monoethylenically unsaturated dicarboxylic acid, where the monoethylenically unsaturated dicarboxylic acid preferably comprises from 1 to 4 carbon atoms, for example 1, 2 or 3;
monomethylated maleic acid;
vinylsulfonic acid, allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acids, 2-acrylamido-2-methylpropanesulfonic acid, vinylphosphonic acid or isopropenylphosphonic acid;
allylphosphonic acids or diallylaminomethylenebisphosphonic acid;
the mixtures of two or more of these acids or acid derivatives;
their salts.

Compounds advantageous as monomers m1 are acrylic acid, methacrylic acid, (3-carboxyethylacrylic acid (oligomerized acrylic acid, and in particular of the type of the abovementioned Sipomer B-CEA), itaconic acid, maleic acid, glutaconic acid, aconitic acid, fumaric acid, vinylbenzoic acid, propylacrylic acid, maleimidopropylcarboxylic acid; and the mixtures of these compounds.

When the monomers m1 contain acid groups, they may be employed during their polymerization in the free acid form (—COOH, for example) or else in a completely or partially neutralized form (carboxylate groups or mixture of carboxylates and of —COOH, for example).

Use may also be made, as monomers m1, of (alone or optionally as a mixture with the abovementioned compounds):

esters of α,β-ethylenically unsaturated mono- or dicarboxylic acid and of alkanediol, such as, for example, 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, and their mixtures.
N-vinyllactams or N-vinyllactam derivatives, typically selected from N-vinylpyrrolidone, vinylpiperidone, vinylcaprolactam, and their mixtures;
chain-opening vinylamide compounds, such as, for example, vinylformamide, vinyl-N-methylformamide, N-vinylacetamide, N-vinyl-N-methylacetamide, N-vinyl-N-ethylacetamide, N-vinylpropionamide, N-vinyl-N-methylpropionamide, vinylbutyramide, and their mixtures;
esters of α,β-ethylenically unsaturated monocarboxylic and dicarboxylic acid with aminoalcohols, selected in particular from N,N-dimethylaminomethyl, N,N-dimethylaminoethyl, N,N-diethylaminoethyl, N,N-dimethylaminopropyl, N,N-diethylaminopropyl and N,N-dimethylaminocyclohexyl acrylates and methacrylates, and the mixtures of these esters;
amides of α,β-ethylenically unsaturated mono- or dicarboxylic acids with diamines having at least one primary or secondary amine group, such as, for example, N-[2-(dimethylamino)ethyl]acrylamide, N-[2-(dimethylamino)ethyl]methacrylamide, N-[3-(dimethylamino)propyl]acrylamide, N-[3-(dimethylamino)propyl]methacrylamide, N-[4-(dimethylamino)butyl]acrylamide, N-[4-(dimethylamino)butyl]methacrylamide, or else alternatively N,N-(diethylamino)ethyl acrylamide, and their mixtures, and the corresponding alkylated quaternary ammoniums;
amides or their derivatives, including in particular hydroxyethylacrylamide, diacetone acrylamide, N-morpholine acrylamide, acrylamidopropyltrimethylammonium chloride, diethylacrylamide, N-isopropylacrylamide, propylacrylamide, and their mixtures;
N,N-diallylamines and/or N,N-diallylalkylamines (where the alkyl is preferably an alkyl comprising from 1 to 4 carbon atoms) and/or their acid addition salts and their quaternized products, for example N,N-diallyl-N- methylamine and/or N,N-diallyl-N,N-dimethylammonium compounds (in particular chlorides and bromides);

vinyl- and/or allyl-substituted nitrogen heterocycles, such as vinylimidazole and vinyl-1,2-methylimidazole;

vinyl- and/or allyl-substituted heteroaromatic compounds, such as, for example, 2- and 4-vinylpyridine, 2- and 4-allylpyridine, and their salts;

amides of esters of sulfobetaines, such as those described, for example, in the application US 2010/0093874.

Mention may in particular be made, as monomers m1 well suited for the scale-inhibiting application according to the invention, of acrylic acid, sodium vinylm sulfonate, styrenesulfonic acids and/or vinylphosphonic acid.

Typically, the initial concentration of monomers in the reaction medium of step (S0) may range up to 40% by weight, indeed even up to 50% by weight, this concentration generally remaining less than 35% by weight, with respect to the total weight of the reaction medium. For example, the initial concentration of monomers in the reaction medium of step (S0) is between 5% and 35%, in particular between 10% and 30% by weight, with respect to the total weight of the reaction medium.

Preferably, in step (S0), all the hydrophilic monomers are dissolved and/or dispersed within the aqueous medium (M).

The Hydrophobic Monomers (m2)

These monomers, employed in step (S0) in the form of a micellar solution, namely a solution containing, in the state dispersed within the medium (M), micelles comprising these hydrophobic monomers. Provided that they may be incorporated into micelles of this type, any monomer of hydrophobic nature may be envisaged in step (S0).

Mention may in particular be made, as nonlimiting examples of hydrophobic monomer which may be used according to the invention, of:

vinylaromatic monomers, such as styrene, α-methylstyrene, para-chloromethylstyrene, vinyltoluene, 2-methylstyrene, 4-methylstyrene, 2-(n-butyl)styrene or 4-(n-decyl)styrene (styrene proves in particular to be advantageous);

halogenated vinyl compounds, such as vinyl or vinylidene halides, for example vinyl or vinylidene chlorides or fluorides, corresponding to the formula $R_bR_cC=CX^1X^2$, where: $X^1$=F or Cl
$X^2$=H, F or Cl
each one of $R_b$ and $R_c$ represents, independently:
  H, Cl, F; or
  an alkyl group, preferably chlorinated and/or fluorinated, more advantageously perchlorinated or perfluorinated;

esters of α,β-ethylenically unsaturated mono- or dicarboxylic acid with $C_2$-$C_{30}$ alkanols, for example methyl ethacrylate, ethyl (meth)acrylate, ethyl ethacrylate, n-propyl (meth)acrylate, isopropyl (meth)acrylate, n-butyl (meth)acrylate, sec-butyl (meth)acrylate, tert-butyl (meth)acrylate, tert-butyl ethacrylate, n-hexyl (meth)acrylate, n-heptyl (meth)acrylate, n-octyl (meth) acrylate, 1,1,3,3-tetramethylbutyl (meth)acrylate, ethylhexyl (meth)acrylate, n-nonyl (meth)acrylate, n-decyl (meth)acrylate, n-undecyl (meth)acrylate, tridecyl (meth)acrylate, myristyl (meth)acrylate, pentadecyl (meth)acrylate, palmityl (meth)acrylate, heptadecyl (meth)acrylate, nonadecyl (meth)acrylate, arachidyl (meth)acrylate, behenyl (meth)acrylate, lignoceryl (meth)acrylate, cerotinyl (meth)acrylate, melissinyl (meth)acrylate, palmitoleoyl (meth)acrylate, oleyl (meth)acrylate, linoleyl (meth)acrylate, linolenyl (meth)acrylate, stearyl (meth)acrylate, lauryl (meth) acrylate and their mixtures;

esters of vinyl or allyl alcohol with $C_1$-$C_{30}$ monocarboxylic acids, for example vinyl acetate, vinyl propionate, vinyl butyrate, vinyl laurate, vinyl stearate, vinyl versatate and their mixtures;

esters of α,β-ethylenically unsaturated mono- and dicarboxylic acids with $C_4$-$C_{30}$ alkanediols, for example 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate and 3-hydroxy-2-ethylhexyl methacrylate;

primary amides of α,β-ethylenically unsaturated mono- and dicarboxylic acids and N-alkyl and N,N-dialkyl derivatives, such as N-propyl(meth)acrylamide, N-(n-butyl)(meth)acrylamide, N-(tert-butyl)(meth)acrylamide, N-(n-octyl)(meth)acrylamide, N-(1,1,3,3-tetramethylbutyl)(meth)acrylamide, N-ethylhexyl(meth)acrylamide, N-(n-nonyl)(meth)acrylamide, N-(n-decyl)(meth)acrylamide, N-(n-undecyl)(meth)acrylamide, N-tridecyl(meth)acrylamide, N-myristyl(meth)acrylamide, N-pentadecyl(meth)acrylamide, N-palmityl(meth)acrylamide, N-heptadecyl(meth)acrylamide, N-nonadecyl(meth)acrylamide, N-arachidyl(meth)acrylamide, N-behenyl(meth)acrylamide, N-lignoceryl(meth)acrylamide, N-cerotinyl(meth)acrylamide, N-melissinyl(meth)acrylamide, N-palmitoleoyl(meth)acrylamide, N-oleyl(meth)acrylamide, N-linoleyl(meth)acrylamide, N-linolenyl(meth)acrylamide, N-stearyl(meth)acrylamide and N-lauryl(meth)acrylamide;

N-vinyllactams and their derivatives, such as N-vinyl-5-ethyl-2-pyrrolidone, N-vinyl-6-methyl-2-piperidone, N-vinyl-6-ethyl-2-piperidone, N-vinyl-7-methyl-2-caprolactam and N-vinyl-7-ethyl-2-caprolactam;

esters of α,β-ethylenically unsaturated mono- and dicarboxylic acids with aminoalcohols, for example N,N-dimethylaminocyclohexyl (meth)acrylate;

amides of α,β-ethylenically unsaturated mono- and dicarboxylic acids with diamines comprising at least one primary or secondary amino group, for example N-[4-(dimethylamino)butyl]acrylamide, N-[4-(dimethylamino)butyl]methacrylamide, N-[2-(dimethylamino)ethyl]acrylamide, N-[4-(dimethylamino)cyclohexyl] acrylamide or N-[4-(dimethylamino)cyclohexyl] methacrylamide.

According to a preferential embodiment, the hydrophobic monomers employed according to the invention may be chosen from:

$C_1$-$C_{30}$ alkyl, preferably $C_4$-$C_{22}$ alkyl, α,β-unsaturated esters, in particular alkyl acrylates and methacrylates, such as ethyl, butyl, 2-ethylhexyl, isooctyl, lauryl, isodecyl, stearyl, oleyl or behenyl acrylates and methacrylates (lauryl methacrylate especially proves to be in particular advantageous);

$C_1$-$C_{30}$ alkyl, preferably $C_4$-$C_{22}$ alkyl, α,β-unsaturated amides, in particular alkylacrylamides and alkylmethacrylamides, such as ethyl-, butyl-, 2-ethylhexyl-, isooctyl-, lauryl-, isodecyl-, stearyl-, oleyl- or behenylacrylamide and -methacrylamide (laurylmethacrylamide in particular proves to be especially advantageous);

vinyl or allyl alcohol esters of saturated carboxylic acids, such as vinyl or allyl acetate, propionate, versatate or stearate;

the mixtures and combinations of two or more of the abovementioned monomers.

According to a specific embodiment, the hydrophobic monomers employed according to the invention are monomers of self-micellizable type. Among other possible illustrative examples, the hydrophobic monomers employed according to the invention may in particular be chosen from:

Sipomer BEM, a monomer or a mixture of monomers corresponding to the following formula:

$$CH_2=CH-CH_2-N^+(-CH_3)-R\ X^-$$

where:
$X^-$ is an anion, in particular a chloride anion;
R is a $C_{10}$ to $C_{22}$, for example between $C_{12}$ and $C_{18}$, alkyl group.

Preferably, the micelles of the micellar solution of step (S0) do not contain monomers having a hydrophilic or water-dispersible nature. Moreover, preferably, all the hydrophobic monomers employed in step (S0) are contained in micelles of the micellar solution.

The Cleavable Chemical Crosslinking Monomers (mR)

These are typically monomers carrying two ethylenically unsaturated groups, separated by a spacer group, including at least one cleavable group of the abovementioned type.

They may typically be monomers of formula $H_2C=C-A-C=CH_2$, where A denotes a saturated or unsaturated, linear or branched and optionally completely or partially cyclized, divalent hydrocarbon chain, for example an alkylene or alkenylene chain, said chain including a cleavable group.

Suitable crosslinking monomers include in particular acrylic esters, methacrylic esters, diallyl ethers and divinyl ethers of alcohols carrying at least two hydroxyl groups (hereinafter denoted by "dihydric" alcohols, this term not being intended to denote here only alcohols carrying exactly two —OH groups but more broadly any alcohol carrying at least two OH groups, it being possible for the OH groups of these alcohols to be completely or partially etherified or esterified).

Suitable monomers mR thus include, for example, acrylic esters, methacrylic esters, diallyl ethers and divinyl ethers of the following dihydric alcohols:

1,2-ethanediol; 1,2-propanediol; 1,3-propanediol; 1,2-butanediol; 1,3-butanediol; 2,3-butanediol; 1,4-butanediol; but-2-ene-1,4-diol; 1,2-pentanediol; 1,5-pentanediol; diethylene glycol; triethylene glycol; tetraethylene glycol; dipropylene glycol; tripropylene glycol; tetrapropylene glycol; 3-thiapentane-1,5-diol; polyethylene glycols and/or polypropylene glycols; and polytetrahydrofurans, these polyols having a molecular weight preferably of between 200 and 10 000;

mixtures of two or more of these alcohols.

The expression "polyethylene glycols and/or polypropylene glycols" is understood here to mean the group consisting of ethylene oxide homopolymers (polyethylene glycols), propylene oxide homopolymers (polypropylene glycols) and copolymers based on ethylene oxide and on propylene oxide, in particular block copolymers comprising at least one polyethylene oxide block and at least one polypropylene oxide block.

Dihydric alcohols well suited in the abovementioned esters and ethers trimethylolpropane, glycerol, pentaerythritol, 1,2,5-pentanetriol, 1,2,6-hexanetriol, sorbitan, or else alternatively sugars, such as, inter alia, sucrose, glucose or mannose.

These dihydric alcohols may advantageously be employed in the form of ethoxylates or propoxylates, namely respectively after reaction with ethylene oxide or propylene oxide.

Alternatively, use may be made of glycidyl ethers, which are obtained by reaction of the polyhydric alcohols with epichlorohydrin.

Mention may also be made, as suitable monomers mR, of:
N-allylamines comprising at least two amine functional groups. Amines of this type include in particular 1,3-diaminopropane or 1,4-diaminobutane;
amides formed from these allylamines comprising two amine functional groups with unsaturated carboxylic acids, such as acrylic acid, methacrylic acid, itaconic acid or maleic acid.

Monomers mR well suited according to the invention, used in the examples given below, are diethylene glycol diacrylate (known as "DiEGDA") and N,N'-methylenebisacrylamide (known as "MBA").

More generally, use may be made, as monomers mR, of acrylamido or methacrylamido compounds, in particular N,N'-methylenebisacrylamide, N,N'-methylenebismethacrylamide, glyoxal bisacrylamide or diacrylamidoacetic acid.

The Radical Polymerization Control Agent

The control agent employed in step (S0) or, if appropriate, in step (S0⁰) of the process of the invention is advantageously a compound carrying a thiocarbonylthio —S(C=S)— group. According to a specific embodiment, the control agent may carry several thiocarbonylthio groups. It may optionally be a polymer chain carrying such a group.

Thus, this control agent may, for example, correspond to the formula (A) below:

(A)

in which:
Z represents:
a hydrogen atom,
a chlorine atom,
an optionally substituted alkyl or optionally substituted aryl radical,
an optionally substituted heterocycle,
an optionally substituted alkylthio radical,
an optionally substituted arylthio radical,
an optionally substituted alkoxy radical,
an optionally substituted aryloxy radical,
an optionally substituted amino radical,
an optionally substituted hydrazinyl radical,
an optionally substituted alkoxycarbonyl radical,
an optionally substituted aryloxycarbonyl radical,
an optionally substituted acyloxy or carboxyl radical,
an optionally substituted aroyloxy radical,
an optionally substituted carbamoyl radical,
a cyano radical,
a dialkyl- or diarylphosphonato radical,
a dialkyl-phosphinato or diaryl-phosphinato radical, or
a polymer chain,
and
$R_1$ represents:
an optionally substituted alkyl, acyl, aryl, aralkyl, alkenyl or alkynyl group, a saturated or unsaturated, aromatic, optionally substituted, carbocycle or heterocycle, or a polymer chain, which is preferably hydrophilic or water-dispersible when the agent is employed in step (S0).

The groups $R_1$ or Z, when they are substituted, may be substituted by optionally substituted phenyl groups, optionally substituted aromatic groups, saturated or unsaturated carbocycles, saturated or unsaturated heterocycles, or groups selected from the following: alkoxycarbonyl or aryloxycarbonyl (—COOR), carboxyl (—COOH), acyloxy (—$O_2$CR), carbamoyl (—$CONR_2$), cyano (—CN), alkylcarbonyl, alkylarylcarbonyl, arylcarbonyl, arylalkylcarbonyl, phthalimido, maleimido, succinimido, amidino, guanidino, hydroxyl (—OH), amino (—$NR_2$), halogen, perfluoroalkyl $C_nF_{2n+1}$ allyl, epoxy, alkoxy (—OR), S-alkyl, S-aryl, groups exhibiting a hydrophilic or ionic nature, such as alkali metal salts of carboxylic acids, alkali metal salts of sulfonic acid, polyalkylene oxide (PEO, PPO) chains, cationic substituents (quaternary ammonium salts), R representing an alkyl or aryl group, or a polymer chain.

For the control agents of formula (A) employed in step (S0), it is generally preferred for the group $R_1$ to be of hydrophilic nature. Advantageously, it is a water-soluble or water-dispersible polymer chain.

The group $R_1$ may alternatively be amphiphilic, namely may exhibit both a hydrophilic and lipophilic nature. It is preferable for $R_1$ not to be hydrophobic.

As regards the control agents of formula (A) employed in step (S0$^0$), $R_1$ may typically be a substituted or unsubstituted, preferably substituted, alkyl group. A control agent of formula (A) employed in step (S0$^0$) may nevertheless comprise other types of groups $R_1$, in particular a cycle or a polymer chain.

The optionally substituted alkyl, acyl, aryl, aralkyl or alkynyl groups generally exhibit from 1 to 20 carbon atoms, preferably from 1 to 12 and more preferentially from 1 to 9 carbon atoms. They may be linear or branched. They may also be substituted by oxygen atoms, in the form in particular of esters, sulfur atoms or nitrogen atoms.

Mention may in particular be made, among the alkyl radicals, of the methyl, ethyl, propyl, butyl, pentyl, isopropyl, tert-butyl, hexyl, octyl, decyl or dodecyl radical.

The alkynyl groups are radicals generally of 2 to 10 carbon atoms; they exhibit at least one acetylenic unsaturation, such as the acetylenyl radical.

The acyl group is a radical generally exhibiting from 1 to 20 carbon atoms with a carbonyl group.

Mention may in particular be made, among the aryl radicals, of the phenyl radical, which is optionally substituted, in particular by a nitro or hydroxyl functional group.

Mention may in particular be made, among the aralkyl radicals, of the benzyl or phenethyl radical, which is optionally substituted, in particular by a nitro or hydroxyl functional group.

When $R_1$ or Z is a polymer chain, this polymer chain may result from a radical or ionic polymerization or result from a polycondensation.

Advantageously, use is made, as control agent for step (S0), and also for step (S0$^0$), if appropriate, of compounds carrying a xanthate —S(C=S)O—, trithiocarbonate, dithiocarbamate or dithiocarbazate functional group, for example carrying an O-ethyl xanthate functional group of formula —S(C=S)OCH$_2$CH$_3$.

When step (S0$^0$) is carried out, it is advantageous in particular to employ, as control agents in this step, a compound chosen from xanthates, trithiocarbonates, dithiocarbamates or dithiocarbazates. Xanthates prove to be very particularly advantageous, in particular those carrying an O-ethyl xanthate —S(C=S)OCH$_2$CH$_3$ functional group, such as O-ethyl S-(1-methoxycarbonylethyl) xanthate (CH$_3$CH(CO$_2$CH$_3$))S(C=S)OEt. Another possible control agent in step (S0$^0$) is dibenzyl trithiocarbonate of formula PhCH$_2$S(C=S)SCH$_2$Ph (where Ph=phenyl).

The living prepolymers obtained in step (S0$^0$) by using the abovementioned control agents prove to be particularly advantageous for carrying out step (S0).

Initiating and Performing of the Radical Polymerizations of Steps (S0) and (S0$^0$)

When it is employed in step (S0), the initiator of the radical polymerization is preferably water-soluble or water-dispersible. Besides this preferential condition, any radical polymerization initiator (source of free radicals) known per se and suited to the conditions chosen for these steps may be employed in step (S0) and step (S0$^0$) of the process of the invention.

Thus, the radical polymerization initiator employed according to the invention may, for example, be chosen from the initiators conventionally used in radical polymerization. It may, for example, be one of the following initiators:

hydrogen peroxides, such as: tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, potassium persulfate or ammonium persulfate, azo compounds, such as: 2,2'-azobis(isobutyronitrile), 2,2'-azobis(2-butanenitrile), 4,4'-azobis(4-pentanoic acid), 1,1'-azobis(cyclohexanecarbonitrile), 2-(t-butylazo)-2-cyanopropane, 2,2'-azobis[2-methyl-N-(1,1)-bis(hydroxymethyl)-2-hydroxyethyl]propionamide, 2,2'-azobis(2-methyl-N-hydroxyethyl]propionamide, 2,2'-azobis(N,N'-dimethyleneisobutyramidine) dichloride, 2,2'-azobis(2-amidinopropane) dichloride, 2,2'-azobis(N,N'-dimethyleneisobutyramide), 2,2'-azobis(2-methyl-N-[1,1-bis(hydroxymethyl)-2-hydroxyethyl]propionamide), 2,2'-azobis(2-methyl-N-[1,1-bis(hydroxymethyl)ethyl]propionamide), 2,2'-azobis[2-methyl-N-(2-hydroxyethyl)propionamide], 2,2'-azobis(isobutyramide) dihydrate, redox systems comprising combinations, such as:

mixtures of hydrogen peroxide, alkyl peroxide, peresters, percarbonates and the like and of any of the iron salts, titanous salts, zinc formaldehyde sulfoxylate or sodium formaldehyde sulfoxylate, and reducing sugars, alkali metal or ammonium persulfates, perborates or perchlorates in combination with an alkali metal bisulfite, such as sodium metabisulfite, and reducing sugars, and alkali metal persulfates in combination with an arylphosphinic acid, such as benzenephosphonic acid and the like, and reducing sugars.

Typically, the amount of initiator to be used is preferably determined so that the amount of radicals generated is at most 50 mol % and preferably at most 20 mol %, with respect to the amount of control or transfer agent.

Very particularly, in step (S0), it generally proves to be advantageous to use a radical initiator of redox type, which exhibits, inter alia, the advantage of not requiring heating of the reaction medium (no thermal initiation) and for which the inventors have now additionally discovered that it proves to be suitable for the micellar polymerization of step (S0).

Thus, the radical polymerization initiator employed in step (S0) may typically be a redox initiator, typically not requiring heating for their thermal initiation. It is typically a mixture of at least one oxidizing agent with at least one reducing agent.

The oxidizing agent present in this redox system is preferably a water-soluble agent. This oxidizing agent may be chosen, for example, from peroxides, such as: hydrogen peroxide, tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, sodium persulfate, potassium persulfate, ammonium persulfate or potassium bromate.

The reducing agent present in the redox system is also preferably a water-soluble agent. This reducing agent may typically be chosen from sodium formaldehyde sulfoxylate (in particular in its dihydrate form, known under the name Rongalit, or in the form of an anhydride), ascorbic acid, erythorbic acid, sulfites, bisulfites or metasulfites (in particular alkali metal sulfites, bisulfites or metasulfites), nitrilotrispropionamides, and tertiary amines and ethanolamines (which are preferably water-soluble).

Possible redox systems comprise combinations such as:
mixtures of water-soluble persulfates with water-soluble tertiary amines,
mixtures of water-soluble bromates (for example, alkali metal bromates) with water-soluble sulfites (for example, alkali metal sulfites),
mixtures of hydrogen peroxide, alkyl peroxide, peresters, percarbonates and the like and of any of the iron salts, titanous salts, zinc formaldehyde sulfoxylate or sodium formaldehyde sulfoxylate, and reducing sugars,
alkali metal or ammonium persulfates, perborates or perchlorates in combination with an alkali metal bisulfite, such as sodium metabisulfite, and reducing sugars, and
alkali metal persulfates in combination with an arylphosphinic acid, such as benzenephosphonic acid and the like, and reducing sugars.

An advantageous redox system comprises (and preferably consists of) the combination of ammonium persulfate and sodium formaldehyde sulfoxylate.

Generally, and in particular in the case of the use of a redox system of the ammonium persulfate/sodium formaldehyde sulfoxylate type, it proves to be preferable for the reaction medium of step (S0) to be devoid of copper. In the case of the presence of copper, it is generally desirable to add a copper-complexing agent, such as EDTA, in an amount suitable for masking its presence.

Whatever the nature of the initiator employed, the radical polymerization of step (S0°) may be carried out in any appropriate physical form, for example in solution in water or in a solvent, for example an alcohol or THF, in emulsion in water ("latex" process) or in bulk, if appropriate while controlling the temperature and/or the pH in order to render entities liquid and/or soluble or insoluble.

After carrying out step (S0), given the specific use of a control agent, polymers functionalized by transfer groups (living polymers) are obtained. This living nature makes it possible, if desired, to employ these polymers in a subsequent polymerization reaction, according to a technique well known per se. Alternatively, if required, it is possible to deactivate or to destroy the transfer groups, for example by hydrolysis, ozonolysis or reaction with amines, according to means known per se. Thus, according to a specific embodiment, the process of the invention may comprise, after step (S0), a step (S1) of hydrolysis, of ozonolysis or of reaction with amines suitable for deactivating and/or destroying all or part of the transfer groups present on the polymer prepared in step (S0).

Surfactants

Use may be made, in order to prepare the micellar solution of the hydrophobic monomers which are employed in step (S0), of any suitable surfactant; in a nonlimiting manner, use may be made, for example, of the surfactants chosen from the following list:

The anionic surfactants may be chosen from:
alkyl ester sulfonates, for example of formula R—CH(SO$_3$M)-CH$_2$COOR', or alkyl ester sulfates, for example of formula R—CH(OSO$_3$M)-CH$_2$COOR', where R represents a $C_8$-$C_{20}$, preferably $C_{10}$-$C_{16}$, alkyl radical, R' represents a $C_1$-$C_6$, preferably $C_1$-$C_3$, alkyl radical and M represents an alkaline earth metal cation, for example the sodium cation, or the ammonium cation. Mention may very particularly be made of methyl ester sulfonates, the R radical of which is a $C_{14}$-$C_{16}$ radical;
alkylbenzenesulfonates, more particularly $C_9$-$C_{20}$ alkylbenzenesulfonates, primary or secondary alkylsulfonates, in particular $C_8$-$C_{22}$ alkylsulfonates, or alkylglycerolsulfonates;
alkyl sulfates, for example of formula ROSO$_3$M, where R represents a $C_{10}$-$C_{24}$, preferably $C_{12}$-$C_{20}$, alkyl or hydroxyalkyl radical and M represents a cation having the same definition as above;
alkyl ether sulfates, for example of formula RO(OA)$_n$SO$_3$M, where R represents a $C_{10}$-$C_{24}$, preferably $C_{12}$-$C_{20}$, alkyl or hydroxyalkyl radical, OA represents an ethoxylated and/or propoxylated group, M represents a cation having the same definition as above and n generally varies from 1 to 4, such as, for example, lauryl ether sulfate with n=2;
alkylamide sulfates, for example of formula RCONHR'OSO$_3$M, where R represents a $C_2$-$C_{22}$, preferably $C_6$-$C_{20}$, alkyl radical, R' represents a $C_2$-$C_3$ alkyl radical and M represents a cation with the same definition as above, and also their polyalkoxylated (ethoxylated and/or propoxylated) derivatives (alkylamide ether sulfates);
salts of saturated or unsaturated fatty acids, for example such as $C_8$-$C_{24}$, preferably $C_{14}$-$C_{20}$, fatty acids, and of an alkaline earth metal cation, N-acyl-N-alkyltaurates, alkylisethionates, alkylsuccinamates and alkyl sulfosuccinates, alkylglutamates, monoesters or diesters of sulfosuccinates, N-acylsarcosinates or polyethoxycarboxylates;
mono- and diester phosphates, for example having the following formula: (RO)$_x$—P(=O)(OM)$_{x'}$, where R represents an optionally polyalkoxylated alkyl, alkylaryl, arylalkyl or aryl radical, x and x' are equal to 1 or 2, provided that the sum of x and x' is equal to 3, and M represents an alkaline earth metal cation;

The nonionic surfactants may be chosen from:
alkoxylated fatty alcohols, for example laureth-2, laureth-4, laureth-7 or oleth-20, alkoxylated triglycerides, alkoxylated fatty acids, alkoxylated sorbitan esters, alkoxylated fatty amines, alkoxylated di(1-phenylethyl)phenols, alkoxylated tri(1-phenylethyl)phenols, alkoxylated alkylphenols, the products resulting from the condensation of ethylene oxide with a hydrophobic compound resulting from the condensation of propylene oxide with propylene glycol, such as the Pluronic products sold by BASF, the products resulting from the condensation of ethylene oxide the compound resulting from the condensation of propylene oxide with ethylenediamine, such as the Tetronic products sold by BASF, alkylpolyglycosides, such as those described in U.S. Pat. No. 4,565,647, or alkylglucosides, or fatty acid amides, for example $C_8$-$C_{20}$ fatty acid amides, in particular fatty acid monoalkanolamides, for example cocamide MEA or cocamide MIPA;

The amphoteric surfactants (true amphoteric entities comprising an ionic group and a potentially ionic group of opposite charge, or zwitterionic entities simultaneously comprising two opposite charges) may be:

betaines generally, in particular carboxybetaines, for example lauryl betaine (Mirataine BB from Rhodia) or octyl betaine or coco betaine (Mirataine BB-FLA from Rhodia); amidoalkyl betaines, such as cocamidopropyl betaine (CAPB) (Mirataine BDJ from Rhodia or Mirataine BET C-30 from Rhodia), or Mackam CET (Rhodia); sulfobetaines or sultaines, such as cocamidopropyl hydroxysultaine (Mirataine CBS from Rhodia);

alkylamphoacetates and alkylamphodiacetates, such as, for example, comprising a cocoyl or lauryl chain (Miranol C2M Conc. NP, C32, L32 in particular, from Rhodia); alkylamphopropionates or alkylamphodipropionates (Miranol C2M SF);

alkyl ampho hydroxypropyl sultaines (Miranol CS);

alkylamine oxides, for example lauramine oxide (INCI);

The cationic surfactants may be optionally polyethoxylated primary, secondary or tertiary fatty amine salts, quaternary ammonium salts, such as tetraalkylammonium, alkylamidoalkylammonium, trialkylbenzylammonium, trialkylhydroxyalkylammonium or alkylpyridinium chlorides or bromides, imidazoline derivatives or amine oxides having a cationic nature. An example of a cationic surfactant is cetrimonium chloride or bromide (INCI);

The surfactants employed according to the present invention may be block copolymers containing at least one hydrophilic block and at least one hydrophobic block different from the hydrophilic block, which are advantageously obtained according to a polymerization process where:

($a_0$) at least one hydrophilic (respectively hydrophobic) monomer, at least one source of free radicals and at least one radical polymerization control agent of the —S(C=S)— type are brought together within an aqueous phase;

($a_1$) the polymer obtained on conclusion of step ($a_0$) is brought into contact with at least one hydrophobic (respectively hydrophilic) monomer different from the monomer employed in step ($a_0$) and at least one source of free radicals;

whereby a diblock copolymer is obtained.

Polymers of the triblock type, or comprising more blocks, may optionally be obtained by carrying out, after step ($a_1$), a step ($a_2$) in which the polymer obtained on conclusion of step ($a_1$) is brought into contact with at least one monomer different from the monomer employed in step ($a_1$) and at least one source of free radicals; and more generally by carrying out (n+1) steps of the type of the abovementioned steps ($a_1$) and ($a_2$) and n is an integer typically ranging from 1 to 3, where, in each step ($a_n$), with n≥1, the polymer obtained on conclusion of step ($a_{n-1}$) is brought into contact with at least one monomer different from the monomer employed in step ($a_{n-1}$) and at least one source of free radicals. Use may be made, for example, according to the invention, of copolymers of the type which are described in WO03068827, WO03068848 and WO2005/021612.

According to a specific embodiment, the hydrophobic monomers present within surfactant micelles employed in micellar polymerization may be monomers which, by themselves, have the property of forming micelles without the need to add additional surfactants (monomers referred to as "self-micellizable" in the continuation of the description). According to this specific embodiment, the surfactant employed may be the self-micellizable hydrophobic monomer itself, employed without other surfactant, although the presence of such an additional surfactant is not excluded. Thus, within the meaning of the present description, when mention is made of hydrophobic monomers within surfactant micelles, this notion encompasses both (i) hydrophobic monomers present within surfactant micelles where the surfactants are other than these monomers and (ii) monomers comprising at least one hydrophobic part or hydrophobic block and forming, by themselves, the micelles in an aqueous medium. The two abovementioned embodiments (i) and (ii) are compatible and may coexist (hydrophobic monomers within micelles formed by another self-micellizable monomer for example, or else micelles comprising a combination of surfactants and self-micellizable monomers).

Various aspects and advantages of the invention will be further illustrated by the examples below, in which polymers were prepared according to the process of the invention.

EXAMPLES

Example 1

The polymer P1 (polyAA/MBA/LMA/Xa) containing 0.4 mol % of Lauryl Methacrylate (LMA) and 10 mol % of N,N-methylenebisacrylamide (MBA) was prepared under the following conditions:

49.60 g of Stepanol WA Extra, 2.54 g of LMA and 19.25 g of demineralized water were introduced, at ambient temperature (20° C.), into a 200 ml HDPE flask. The mixture was left to stir using a magnetic bar for 30 min until the solution was clear. (Solution A)

7.554 g of Rhodixan A1, 131.24 g of ethanol and 33.61 g of MBA were weighed out in a 2000 ml beaker. 157.11 g of acrylic acid (AA) and 526.33 g of demineralized water are subsequently added. After stirring, the solution is homogeneous and clear. (Solution B) Solution A is added to Solution B. After stirring for 15 min, the solution remains cloudy. This new solution was charged to a Dewar flask (3000 ml) equipped with a cap which makes possible an atmospheric airtightness, an anchor stirrer, a temperature probe and a nitrogen inlet, at ambient temperature (20° C.).

The mixture was degassed by bubbling with nitrogen for 60 minutes. 0.75 g of sodium formaldehyde sulfoxylate, in the form of a 10% by weight aqueous solution, and 0.75 g of sodium persulfate (10% by weight aqueous solution) were added to the medium all at once. The mixture was degassed beforehand by bubbling with nitrogen for 15 minutes.

The polymerization reaction was then allowed to take place with stirring for 16 hours.

At the end of the synthesis, the product is recovered in the form of a gel which will subsequently be shaped (extrusion/drying/grinding) in order to ultimately obtain a handleable granular material.

Example 2

The polymer P2 (polyAA/MBA/LMA/Xa) containing 0.8 mol % of Lauryl Methacrylate (LMA) and 10 mol % of N,N-methylenebisacrylamide (MBA) was prepared under the following conditions:

97.81 g of Stepanol WA Extra, 5.00 g of LMA and 37.88 g of demineralized water were introduced, at ambient temperature (20° C.), into a 200 ml HDPE flask. The mixture was left to stir using a magnetic bar for 30 min until the solution was clear. (Solution A)

7.45 g of Rhodixan A1, 104.04 g of ethanol and 33.22 g of MBA were weighed out in a 2000 ml beaker. 154.98 g of acrylic acid (AA) and 417.54 g of demineralized water are subsequently added. After stirring, the solution is homogeneous and clear. (Solution B) Solution A is added to Solution B. After stirring for 15 min, the solution remains cloudy.

This new solution was charged to a Dewar flask (3000 ml) equipped with a cap which makes possible an atmospheric airtightness, an anchor stirrer, a temperature probe and a nitrogen inlet, at ambient temperature (20° C.).

The mixture was degassed by bubbling with nitrogen for 60 minutes. 0.75 g of sodium formaldehyde sulfoxylate, in the form of a 10% by weight aqueous solution, and 0.75 g of sodium persulfate (10% by weight aqueous solution) were added to the medium all at once.

The mixture was degassed beforehand by bubbling with nitrogen for 15 minutes.

The polymerization reaction was then allowed to take place with stirring for 16 hours.

At the end of the synthesis, the product is recovered in the form of a gel which will subsequently be shaped (extrusion/drying/grinding) in order to ultimately obtain a handleable granular material.

Example 3

(Counterexample)

The polymer P3 (polyAA/MBA/Xa) containing 10 mol % of N,N-methylenebisacrylamide (MBA) was prepared under the following conditions:

9.09 g of Rhodixan A1, 191.10 g of ethanol, 189.13 g of acrylic acid (AA) and 40.45 g of MBA were weighed out in a 2000 ml beaker. After stirring, the MBA is not dissolved.

768.21 g of demineralized water were added; after stirring, the solution becomes clear. The pH of the solution is measured using a pH probe; the measured pH is 2.1.

The solution was charged to a Dewar flask (3000 ml) equipped with a cap which makes possible an atmospheric airtightness, an anchor stirrer, a temperature probe and a nitrogen inlet, at ambient temperature (20° C.).

The mixture was degassed by bubbling with nitrogen for 60 minutes. 1.80 g of sodium formaldehyde sulfoxylate, in the form of a 5% by weight aqueous solution, and 2.25 g of sodium persulfate (4% by weight aqueous solution) were added to the medium all at once.

The mixture was degassed beforehand by bubbling with nitrogen for 15 minutes.

The polymerization reaction was then allowed to take place with stirring for 16 hours.

At the end of the synthesis, the product is recovered in the form of a gel which will subsequently be shaped (extrusion/drying/grinding) in order to ultimately obtain a handleable granular material.

Example 4

(Counterexample)

The polymer P4 (polyAA/MBA/Xa) containing 15 mol % of N,N-methylenebisacrylamide (MBA) was prepared under the following conditions:

8.41 g of Rhodixan A1, 191.52 g of ethanol, 170.70 g of acrylic acid (AA) and 56.11 g of MBA were weighed out in a 2000 ml beaker. After stirring, the MBA is not dissolved.

767.55 g of demineralized water were added; after stirring, the solution becomes clear. The pH of the solution is measured using a pH probe; the measured pH is 2.2.

The solution was charged to a Dewar flask (3000 ml) equipped with a cap which makes possible an atmospheric airtightness, an anchor stirrer, a temperature probe and a nitrogen inlet, at ambient temperature (20° C.).

The mixture was degassed by bubbling with nitrogen for 60 minutes. 0.90 g of sodium formaldehyde sulfoxylate, in the form of a 10% by weight aqueous solution, and 0.90 g of sodium persulfate (10% by weight aqueous solution) were added to the medium all at once.

The mixture was degassed beforehand by bubbling with nitrogen for 15 minutes.

The polymerization reaction was then allowed to take place with stirring for 16 hours.

At the end of the synthesis, the product is recovered in the form of a gel which will subsequently be shaped (extrusion/drying/grinding) in order to ultimately obtain a handleable granular material.

Example 5

Shaping by Extrusion and then Drying of the Gels Resulting from the Syntheses P1 and P2

The gels P1 and P2 resulting from the syntheses described in examples 1 and 2 and containing approximately 75% water are then extruded and subsequently dried at 105° C. on a fluid bed.

The laboratory extruder consists of a Bosch ProPower mincer fitted with grids of variable diameters: grids having perforations of 3 mm and 8 mm were used.

The products after extrusion are then dried on a laboratory fluid bed (Retsch) at 105° C. for 20 minutes. A nonsticky powder is obtained directly, the particle size distribution of which was determined by means of sieves (mesh sizes from 2 mm to 0.4 mm).

The particle size distributions of the powders obtained from P1 and P2 are presented in the tables below.

|  | % by weight | | % by weight | | |
|---|---|---|---|---|---|
|  | 3 mm | | | 8 mm | 3 mm |
| Fraction (mm) | P1 | P2 | Fraction (mm) | P2 | |
| x < 0.400 | 17.5 | 23.0 | x < 0.500 | 8.0 | 22.8 |
| 0.400 < x < 0.500 | 6.7 | 7.2 | 0.500 < x < 0.710 | 5.8 | 7.2 |
| 0.500 < x < 0.630 | 10.1 | 11.2 | 0.710 < x < 1.000 | 10.6 | 11.1 |
| 0.630 < x < 0.710 | 7.5 | 8.1 | 1.000 < x < 1.400 | 14.0 | 8.0 |
| 0.710 < x < 0.800 | 6.1 | 7.0 | 1.400 < x < 2.000 | 20.9 | 6.9 |
| 0.800 < x < 1.000 | 10.1 | 8.4 | x > 2.000 | 40.6 | 43.9 |
| 1.000 < x < 1.400 | 18.4 | 15.3 | | | |

|  | % by weight | | | % by weight |
| --- | --- | --- | --- | --- |
|  | 3 mm | | | 8 mm  3 mm |
| Fraction (mm) | P1 | P2 | Fraction (mm) | P2 |
| 1.400 < x < 2.000 | 18.0 | 15.1 |  |  |
| x > 2.000 | 5.6 | 4.7 |  |  |

Example 6

Evaluation of the Release Capacity of the Materials in a Seawater Medium and at Temperature (85° C.)

This example illustrates the capacity of the polymeric materials synthesized above to release scale-inhibiting polymeric units when they are subjected to an increase in temperature in a saline aqueous medium, in this instance seawater. Depending on the sensitivity to the release conditions of the crosslinking agents present in the material, the release profile and the release duration will be different for a given temperature.

The polymeric materials resulting from examples 1 to 4 are dried at 105° C. for 2 hours and then lightly ground manually (size of the grains of between 0.5 mm and a few mm). For each of the products resulting from examples 1 to 4, approximately 0.5-0.6 g of dried product is introduced into a 60 ml glass flask containing 50 g of salt water (seawater), the composition of which is described below.

| Seawater | | | |
| --- | --- | --- | --- |
| Ion | mg/l | Salt | (g/l) |
| $Na^+$ | 31 275 | NaCl | 79.50 |
| $Ca^{2+}$ | 2000 | $CaCl_2 \cdot 2H_2O$ | 7.34 |
| $Mg^{2+}$ | 739 | $MgCl_2 \cdot 6H_2O$ | 6.18 |
| $K^+$ | 654 | KCl | 1.25 |
| $Ba^{2+}$ | 269 | $BaCl_2 \cdot 2H_2O$ | 0.48 |
| $Sr^{2+}$ | 87.6 | $SrCl_2 \cdot 6H_2O$ | 2.35 |

After closing the flasks, the latter are placed in ovens at 85° C.

The pH of the solutions is then between 3 and 6.

At regular time intervals (a few days), the water in the flasks is renewed under hot conditions (at conditioning temperature). The fraction of water replaced is retained in order to be analyzed for Total Organic Carbon content on a TOC meter (TOC-L) from Shimadzu, suitable for saline media. The Total Organic Carbon measurement makes it possible to go back to the contents of released polymers. A multiplying factor of 2 (corresponding to 50% of carbon present in a polyacrylic acid) was applied to the measured organic carbon content in order to express the results as a percentage of released polymer.

The cumulative carbon contents and polymer contents measured on the 4 products resulting from examples 1 to 4, brought into contact with seawater at 85° C., are brought together in the tables below.

| P3 example 3 - 85° C. | | | P4 example 4 - 85° C. | | |
| --- | --- | --- | --- | --- | --- |
| days | cumulative TOC | % polymer released | days | cumulative TOC | % polymer released |
| 4 | 1230 | 24.6 | 4 | 824 | 16.5 |
| 7 | 1807 | 36.1 | 7 | 1096 | 21.9 |
| 11 | 2612 | 52.2 | 11 | 1705 | 34.1 |
| 14 | 2861 | 100 | 14 | 2533 | 50.6 |
|  |  |  | 20 | 3182 | 79 |
|  |  |  | 25 | 4905 | 98 |

| P1 example - 85° C. | | | P2 example 2 - 85° C. | | |
| --- | --- | --- | --- | --- | --- |
| days | cumulative TOC | % polymer released | days | cumulative TOC | % polymer released |
| 4 | 650 | 13 | 4 | 478 | 9.6 |
| 7 | 963 | 19.3 | 7 | 706 | 14.1 |
| 11 | 1687 | 33.7 | 11 | 1069 | 21.4 |
| 14 | 2299 | 46 | 14 | 1432 | 28.6 |
| 18 | 2795 | 56 | 18 | 1566 | 31.3 |
| 25 | 3992 | 80 | 21 | 2175 | 43.5 |
| 30 | 4741 | 95 | 29 | 2835 | 56.7 |
|  |  |  | 37 | 4000 | 80 |
|  |  |  | 49 | 4700 | 94 |

Example 7

Evaluation of the Release Capacity of the Materials in a Highly Saline Medium and at Temperature (60° C. and 85° C.)

This example illustrates the capacity of the polymeric materials synthesized above to release scale-inhibiting polymeric units when they are subjected to an increase in temperature in a saline aqueous medium. Depending on the sensitivity to the release conditions of the crosslinking agents present in the material, the release profile and the release duration will be different for a given temperature.

The polymeric materials resulting from examples 1 to 4 are dried at 105° C. for 2 hours and then lightly ground manually (size of the grains of between 0.5 mm and a few mm). For each of the products resulting from examples 1 to 4, approximately 0.5-0.6 g of dried product is introduced into a 60 ml glass flask containing 50 g of salt water (Forties formation water), the composition of which is described below.

| Forties water | | | |
| --- | --- | --- | --- |
| Ion | mg/l | Salt | (g/l) |
| $Na^+$ | 31 275 | NaCl | 79.50 |
| $Ca^{2+}$ | 2000 | $CaCl_2 \cdot 2H_2O$ | 7.34 |
| $Mg^{2+}$ | 739 | $MgCl_2 \cdot 6H_2O$ | 6.18 |
| $K^+$ | 654 | KCl | 1.25 |
| $Ba^{2+}$ | 269 | $BaCl_2 \cdot 2H_2O$ | 0.48 |
| $Sr^{2+}$ | 87.6 | $SrCl_2 \cdot 6H_2O$ | 2.35 |

After closing the bottles, the latter are placed in ovens, one at 60° C. and the other at 85° C. The pH of the solutions is between 3 and 6.

At regular time intervals, a few days in the first 2 months up to a few weeks from the third month, the water in the flasks is renewed under hot conditions (at conditioning temperature). The fraction of water replaced is retained in order to be analyzed for Total Organic Carbon content on a TOC meter (TOC-L) from Shimadzu, suitable for saline media. The Total Organic Carbon measurement makes it possible to go back to the contents of released polymers. A multiplying factor of 2 (corresponding to 50% of carbon present in a polyacrylic acid) was applied to the measured organic carbon content in order to express the results as a percentage of released polymer.

The cumulative carbon contents and polymer contents measured on the 4 products resulting from examples 1 to 4, at 60° C. and at 85° C., are brought together in the tables below.

| P3 example 3 - 85° C. | | P4 example 4 - 85° C. | |
|---|---|---|---|
| days | cumulative TOC | % polymer released | days | cumulative TOC | % polymer released |
| 2 | 799 | 12.1 | 2.0 | 705 | 11.8 |
| 8 | 1420 | 21.5 | 8.0 | 1031 | 17.2 |
| 15 | 2934 | 44.5 | 15.0 | 1840 | 30.7 |
| 17 | 3714 | 56.3 | 17.0 | 2207 | 36.8 |
| 22 | 4603 | 69.7 | 22.0 | 2771 | 46.2 |
| 27 | 5445 | 82.5 | 27.0 | 3346 | 55.8 |
| 31 | 6222 | 94.3 | 31.0 | 4266 | 71.1 |
| 35 | 6419 | 97.3 | 35.0 | 4956 | 82.6 |
| 41 | 6514 | 98.7 | 41.0 | 5658 | 94.3 |
| 48 | 6520 | 98.8 | 48.0 | 5886 | 98.1 |
| 55 | 6520 | 98.8 | 55.0 | 5918 | 98.6 |
| | | | 63.0 | 5926 | 98.8 |

| P1 example 1 - 85° C. | | | P2 example 2 - 85° C. | | |
|---|---|---|---|---|---|
| days | cumulative TOC | % polymer released | days | cumulative TOC | % polymer released |
| 4 | 667 | 13.3 | 2 | 387 | 7.7 |
| 7 | 859 | 17.2 | 8 | 709 | 14.2 |
| 11 | 1414 | 28.3 | 15 | 1329 | 26.6 |
| 14 | 1887 | 37.7 | 17 | 1418 | 28.4 |
| 18 | 2369 | 47.4 | 22 | 1598 | 32.0 |
| 21 | 2774 | 55.5 | 27 | 1754 | 35.1 |
| 29 | 3469 | 69.4 | 31 | 1853 | 37.1 |
| 36 | 3682 | 73.6 | 35 | 1980 | 39.7 |
| 47 | 3821 | 76.4 | 41 | 2131 | 42.7 |
| 78 | 3936 | 78.7 | 48 | 2219 | 44.5 |
| 99 | 3988 | 79.8 | 55 | 2280 | 45.7 |
| 131 | 4052 | 81.0 | 63 | 2323 | 46.6 |
| 187 | 4104 | 82.1 | 69 | 2352 | 47.1 |
| | | | 76 | 2388 | 47.9 |
| | | | 83 | 2415 | 48.4 |
| | | | 90 | 2442 | 48.9 |
| | | | 97 | 2466 | 49.4 |
| | | | 108 | 2503 | 50.2 |
| | | | 115 | 2528 | 50.7 |
| | | | 128 | 2568 | 51.5 |
| | | | 161 | 2670 | 53.5 |
| | | | 183 | 2728 | 54.7 |
| | | | 213 | 2792 | 56.0 |
| | | | 267 | 2909 | 58.3 |

| P3 example 3-60° C. | | | P4 example 4-60° C. | | | P2 example 2-60° C. | | |
|---|---|---|---|---|---|---|---|---|
| days | cumulative TOC | % polymer released | days | cumulative TOC | % polymer released | days | cumulative TOC | % polymer released |
| 4 | 210 | 4.2 | 4 | 452 | 9.0 | 4 | 529 | 10.58 |
| 6 | 242 | 4.8 | 6 | 483 | 9.7 | 6 | 571 | 11.42 |
| 11 | 277 | 5.5 | 11 | 520 | 10.4 | 11 | 617 | 12.34 |
| 13 | 292 | 5.8 | 13 | 532 | 10.6 | 13 | 632 | 12.64 |
| 18 | 322 | 6.4 | 18 | 561 | 11.2 | 18 | 670 | 13.4 |
| 21 | 363 | 7.3 | 21 | 575.5 | 11.5 | 21 | 689 | 13.78 |
| 25 | 383 | 7.7 | 25 | 593 | 11.9 | 25 | 711 | 14.22 |
| 28 | 408 | 8.2 | 28 | 606 | 12.1 | 28 | 733 | 14.66 |
| 32 | 427 | 8.5 | 32 | 622 | 12.4 | 32 | 757 | 15.14 |
| 39 | 455 | 9.1 | 39 | 645 | 12.9 | 39 | 790 | 15.8 |
| 83 | 567 | 11.3 | 83 | 749 | 15.0 | 83 | 954 | 19.08 |
| 125 | 764 | 15.3 | 125 | 852 | 17.0 | 125 | 1060 | 21.2 |

Example 8

Evaluation Under Static Conditions of the Limescale-Inhibiting Performance Dualities of the Polymeric Entities Released The procedure for the evaluation of the scale-inhibiting performance qualities is derived from the NACE standard TM0374-2016 ("Laboratory Screening Tests to Determine the Ability of Scale Inhibitors to Prevent the Precipitation of Calcium Sulfate and Calcium Carbonate from Solution (for Oil and Gas Production Systems)").

This procedure, called "Jar test" or "Bottle Test", makes it possible to measure the performance qualities for inhibiting $CaCO_3$ under static conditions. It consists in measuring the content of calcium precipitating after mixing two incompatible waters in a flask, then change in the mixture without stirring for a given time, and measurement of the calcium concentration by a volumetric method or a spectroscopic (ICP-AES) method for soluble cations. The experiments comprise a control test without inhibitor and tests in the presence of inhibitors.

This evaluation is carried out at 71° C. after mixing two brines, one of which contains cations, including calcium, and the other anions, including carbonate. These brines are saturated beforehand with carbon dioxide. The inhibitor is placed in the water of the anions. The inhibitor concentration generally varies between 1 to 2 ppm and 10 ppm.

In this example, as the inhibitor originates from the water fractions collected at regular intervals, a volume of the water fraction containing the released polymer (cf. withdrawals carried out in example 5) is introduced such that the final content of scale-inhibiting polymer in the test is between 4 ppm and 10 ppm as active material.

The compositions of the brines are as follows:

| Water of the cations | |
|---|---|
| Salt | (g/l) |
| NaCl | 33.00 |
| $CaCl_2 \cdot 2H_2O$ | 12.15 |
| $MgCl_2 \cdot 6H_2O$ | 3.68 |

| Water of the anions | |
|---|---|
| Salt | (g/l) |
| NaCl | 33.00 |
| $NaHCO_3$ | 7.36 |

The waters are subsequently saturated with $CO_2$ by bubbling through the sintered tip for approximately 1 h under a flow of $CO_2$.

50 ml of each of these waters are conditioned in polyethylene flasks.

After having equilibrated the temperature of the brines at 71° C. in an oven, the contents of the "water of the anions" flask are poured into the flask containing the cations. Stirring is carried out manually and then the mixture is put back in the oven at 71° C. for 24 h.

For each series of tests, two control tests are carried out:

blank Min: this is a test without inhibitor; the calcium ion content will be a minimum (maximum precipitation of $CaCO_3$).

blank Max: this is a test without carbonate and without inhibitor; the water of the anions is replaced with purified water; the calcium ion content will be a maximum, because there is no precipitation.

After 24 hours of testing, the flasks are taken out of the oven and left to cool. A withdrawn sample of 1 ml is then taken and then diluted in 20 ml of permuted water. A quantitative determination of calcium is carried out on these withdrawn samples and the inhibition efficiency, expressed according to the formula below, is deduced therefrom.

$$\% \text{ efficiency} = \frac{[Ca^{2+}] - [Ca^{2+}]_{min}}{[Ca^{2+}]_{max} - [Ca^{2+}]_{min}} * 100$$

with $[Ca^{2+}]_{max}$=concentration of $Ca^{2+}$ in the blank Max $[Ca^{2+}]_{min}$=$Ca^{2+}$ concentration in the blank Min The inhibitory performance qualities of the withdrawn samples described in the preceding example 5 and containing the polymeric entities released are brought together in the tables below.

TABLE

| conditioning at 85° C. | | | |
|---|---|---|---|
| Material | Release time | Polymer concentration in the test | % $CaCO_3$ inhibition efficiency |
| P2 example 2 | 181 | 4 | 89 |
| P2 example 2 | 181 | 8 | 98 |
| P2 example 2 | 160 | 4 | 100 |
| P2 example 2 | 160 | 8 | 100 |
| P1 example 1 | 78 | 4 | 95 |
| P1 example 1 | 78 | 8 | 82 |
| P2 example 2 | 128 | 5 | 94 |
| P2 example 2 | 128 | 10 | 98 |
| P2 example 2 | 55 | 5 | 62 |
| P2 example 2 | 55 | 10 | 96 |
| P1 example 1 | 18 | 5 | 72 |
| P1 example 1 | 18 | 10 | 90 |
| P1 example 1 | 47 | 5 | 48 |
| P1 example 1 | 47 | 10 | 77 |
| P3 example 3 | 35 | 5 | 21 |
| P3 example 3 | 35 | 10 | 45 |
| P4 example 4 | 55 | 5 | 17 |
| P4 example 4 | 55 | 10 | 50 |

TABLE

| conditioning at 60° C. | | | |
|---|---|---|---|
| Material | Release time (days) | Polymer concentration in the test | % $CaCO_3$ inhibition efficiency |
| P2 example 2 | 125 | 4 | 91 |
| P2 example 2 | 125 | 8 | 96 |
| P4 example 4 | 125 | 4 | 80 |
| P4 example 4 | 125 | 8 | 100 |
| P3 example 3 | 125 | 4 | 90 |
| P3 example 3 | 125 | 8 | 99 |

The invention claimed is:

1. A method for the gradual release of polymer chains within a liquid release medium (LRM), said method comprising a step (S) comprising contacting said medium (LRM) with solid objects, wherein the solid objects are formed by polymer chains soluble in the medium (LRM) and carrying hydrophobic side groups ensuring hydrophobic/hydrophobic physical crosslinking between said polymer chains within said solid objects, and wherein the solid objects employed in step (S) result from a step (S0) of micellar radical polymerization in which the following are brought into contact, within an aqueous medium (M):

ethylenically unsaturated monomers (m1), dissolved or dispersed in said aqueous medium (M);

ethylenically unsaturated monomers (m2), in the form of a micellar solution, namely containing, in the dispersed state within the medium (M), micelles comprising these hydrophobic monomers, said monomers (m2) being, in all or part, monomers carrying hydrophobic chains suitable for ensuring the desired hydrophobic/hydrophobic physical crosslinking in the solid objects employed in step (S);

at least one radical polymerization initiator; and at least one radical polymerization control agent, and wherein the monomers employed in step (S0) contain crosslinking monomers (mR) comprising at least two ethylenic unsaturations separated by at least one cleavable group, and wherein the molar ratio (mR)/(m1), which corresponds to the amount of crosslinking monomers (mR) with respect to the total amount of hydrophilic monomers, is greater than 0.5% and less than or equal to 30%.

2. The method as claimed in claim 1, wherein the released polymer chains have a number average molecular weight of between 500 and 100 000 g/mol.

3. The method as claimed in claim 1, wherein the medium (LRM) is an aqueous medium and wherein the released polymer chains are water-soluble.

4. The method as claimed in claim 1, wherein the radical polymerization control agent is a compound which comprises a thiocarbonylthio —S(C=S)— group.

5. The method as claimed in claim 1, wherein the polymer chains released are polymer chains useful as scale-inhibiting, clathrate-inhibiting and/or corrosion-inhibiting agent.

6. The method as claimed in claim 5, wherein the medium (LRM) of step (S) is a liquid medium encountered during the extraction of oil within a hydrocarbon reservoir.

7. The method as claimed in claim 1, where step (S) is carried out at a temperature of greater than or equal to 50° C., and of less than or equal to 150° C.

8. The method as claimed in claim 1, wherein the at least one radical polymerization initiator is water-soluble or water-dispersible.

9. The method as claimed in claim 1, wherein the radical polymerization control agent is a xanthate.

10. The method as claimed in claim 1, wherein the molar ratio (mR)/(m1), which corresponds to the amount of cross-linking monomers (mR) with respect to the total amount of hydrophilic monomers, is greater than 1% and less than or equal to 30%.

11. The method as claimed in claim 1, wherein the molar ratio (mR)/(m1), which corresponds to the amount of cross-linking monomers (mR) with respect to the total amount of hydrophilic monomers, is greater than 2% and less than or equal to 30%.

12. The method as claimed in claim 1, wherein the molar ratio (mR)/(m1), which corresponds to the amount of cross-linking monomers (mR) with respect to the total amount of hydrophilic monomers, is less than or equal to 20%.

13. The method as claimed in claim 1, wherein the molar ratio (mR)/(m1), which corresponds to the amount of cross-linking monomers (mR) with respect to the total amount of hydrophilic monomers, is less than or equal to 10%.

14. The method as claimed in claim 1, where step (S) is carried out at a temperature between 60° C. and 120° C.

* * * * *